United States Patent
Serizawa

(10) Patent No.: US 10,707,491 B2
(45) Date of Patent: Jul. 7, 2020

(54) BINDER FOR SECONDARY BATTERY

(71) Applicant: NEC CORPORATION, Tokyo (JP)

(72) Inventor: Shin Serizawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/076,933

(22) PCT Filed: Feb. 9, 2017

(86) PCT No.: PCT/JP2017/004719
§ 371 (c)(1),
(2) Date: Aug. 9, 2018

(87) PCT Pub. No.: WO2017/138604
PCT Pub. Date: Aug. 17, 2017

(65) Prior Publication Data
US 2019/0044149 A1 Feb. 7, 2019

(30) Foreign Application Priority Data

Feb. 10, 2016 (JP) .................. 2016-023455

(51) Int. Cl.
*H01M 4/13* (2010.01)
*H01M 4/62* (2006.01)
(Continued)

(52) U.S. Cl.
CPC .......... *H01M 4/622* (2013.01); *H01M 4/134* (2013.01); *H01M 4/364* (2013.01); *H01M 4/386* (2013.01);
(Continued)

(58) Field of Classification Search
CPC ...... H01M 4/622; H01M 4/134; H01M 4/364; H01M 4/386; H01M 10/052; H01M 10/0525
See application file for complete search history.

(56) References Cited

U.S. PATENT DOCUMENTS

2006/0099506 A1   5/2006  Krause et al.
2007/0020522 A1   1/2007  Obrovac et al.
(Continued)

FOREIGN PATENT DOCUMENTS

JP    6-163031 A       6/1994
JP    2009-503787 A    1/2009
(Continued)

OTHER PUBLICATIONS

International Search Report for PCT/JP2017/004719 dated, May 9, 2017 (PCT/ISA/210).

*Primary Examiner* — Jane J Rhee
(74) *Attorney, Agent, or Firm* — Sughrue Mion, PLLC

(57) ABSTRACT

An object of the present invention is to provide a binder composition for a secondary battery for achieving improved charge-discharge efficiency and good cycle characteristics at the same time. The binder composition for a secondary battery according to the present invention is characterized in comprising a polyamic acid comprising a repeating unit consisting of a skeleton based on an aromatic tetracarboxylic acid dianhydride and a skeleton based on an alicyclic diamine represented by structural formula: $NH_2-(CH_2)_n-R^2-(CH_2)_m-NH_2$, wherein $R^2$ represents alicyclic group, and n and m each independently represent the number of repeating units selected from 1 to 5; and/or a polyamic acid comprising a repeating unit consisting of a skeleton based on an alicyclic tetracarboxylic acid dianhydride and a skeleton based on an aromatic diamine.

7 Claims, 1 Drawing Sheet

(51) Int. Cl.
*H01M 10/052* (2010.01)
*H01M 4/134* (2010.01)
*H01M 4/36* (2006.01)
*H01M 4/38* (2006.01)
*H01M 10/0525* (2010.01)

(52) U.S. Cl.
CPC ..... *H01M 10/052* (2013.01); *H01M 10/0525* (2013.01); *Y02E 60/122* (2013.01); *Y02T 10/7011* (2013.01)

(56) References Cited

U.S. PATENT DOCUMENTS

| | | | |
|---|---|---|---|
| 2010/0304160 A1* | 12/2010 | Fukukawa | C08G 73/1007 428/458 |
| 2012/0196184 A1 | 8/2012 | Tanaka et al. | |
| 2013/0288120 A1 | 10/2013 | Iida et al. | |
| 2016/0233513 A1 | 8/2016 | Abe et al. | |

FOREIGN PATENT DOCUMENTS

| | | | |
|---|---|---|---|
| JP | 2012-160353 A | 8/2012 | |
| JP | 2013-023579 A | 2/2013 | |
| JP | 2013-144750 A | 7/2013 | |
| JP | 2014-032909 A | 2/2014 | |
| JP | 2014-034590 A | 2/2014 | |
| JP | 2014-078416 A | 5/2014 | |
| JP | 2017-076468 A | 4/2017 | |
| WO | 2012/090827 A1 | 7/2012 | |
| WO | 2013/008437 A1 | 1/2013 | |
| WO | 2014/185353 A1 | 11/2014 | |
| WO | 2015/046304 A1 | 4/2015 | |
| WO | 2016/125718 A1 | 8/2016 | |

* cited by examiner

BINDER FOR SECONDARY BATTERY

CROSS REFERENCE TO RELATED APPLICATIONS

This application is a National Stage of International Application No. PCT/JP2017/004719 filed Feb. 9, 2017, claiming priority based on Japanese Patent Application No. 2016-023455, filed Feb. 10, 2016, the entire disclosure of which is hereby incorporated by reference.

TECHNICAL FIELD

The present invention relates to a binder for a secondary battery, a electrode mixture paste for a secondary battery and a secondary battery using them.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving motorcycles and automobiles and storage cells for smart grids, have attracted attention. As the demand for lithium ion secondary batteries has increased and they have been used in various fields, batteries have been required to have characteristics, such as further higher energy density, lifetime characteristics that can withstand long-term use, and usability under a wide range of temperature conditions.

Although carbon-based materials are usually used in a negative electrode of the lithium ion secondary battery, in order to increase the energy density of the battery, using a silicon-based material absorbing and desorbing a large amount of lithium ions per unit volume in the negative electrode is studied. However, there is a problem in that the silicon-based materials expand and contract by repeating charge and discharge of lithium, and thereby, the active material layer is damaged and peels off from the current collector to deteriorate the cycle characteristics of the battery.

It is known that a polyimide resin having higher mechanical strength is used as a binder in a negative electrode using the silicon-based material in order to solve this problem. Patent Document 1 discloses a reaction product between an aromatic diamine and an aromatic tetracarboxylic acid dianhydride as a specific example of the polyimide resin. Patent Document 2 discloses a polyimide resin consisting of a reaction product between an aromatic diamine and an aliphatic tetracarboxylic acid, which can improve charge and discharge efficiency compared with a polyimide resin consisting of a reaction product between an aromatic diamine and an aromatic tetracarboxylic acid anhydride. Patent Document 3 discloses a polyimide resin consisting of a reaction product between an alicyclic diamine and an aromatic tetracarboxylic acid.

CITATION LIST

Patent Document

Patent Document 1: Japanese patent laid-open No. 116-163031
Patent Document 2: U.S. patent application publication No. 2006/0099506
Patent Document 3: Japanese patent laid-open No. 2014-78416

SUMMARY OF INVENTION

Technical Problem

However, the polyimide binders described in the above-mentioned prior art documents have a problem that it is difficult to achieve improved charge-discharge efficiency and good cycle characteristics at the same time. In particular, in the case of an electrode comprising the silicon-based material having a large expansion and contraction, such a problem manifests remarkably.

An object of the present invention is to provide a binder composition for a secondary battery for achieving improved charge-discharge efficiency and good cycle characteristics at the same time.

Solution to Problem

The binder composition for a secondary battery according to the present invention comprises a polyamic acid comprising a repeating unit consisting of a skeleton based on an aromatic tetracarboxylic acid dianhydride and a skeleton based on an alicyclic diamine represented by the following structural formula; and/or a polyamic acid comprising a repeating unit consisting of a skeleton based on an alicyclic tetracarboxylic acid dianhydride and a skeleton based on an aromatic diamine.

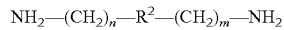
$$NH_2-(CH_2)_n-R^2-(CH_2)_m-NH_2$$

(In the formula, $R^2$ represents alicyclic group, and n and m each independently represent the number of repeating units selected from 1 to 5.)

Advantageous Effect of Invention

With the binder composition for a secondary battery according to the present invention, it is possible to produce a secondary battery having both high charge-discharge efficiency and high cycle characteristics.

DESCRIPTION OF EMBODIMENTS

Figure 1:
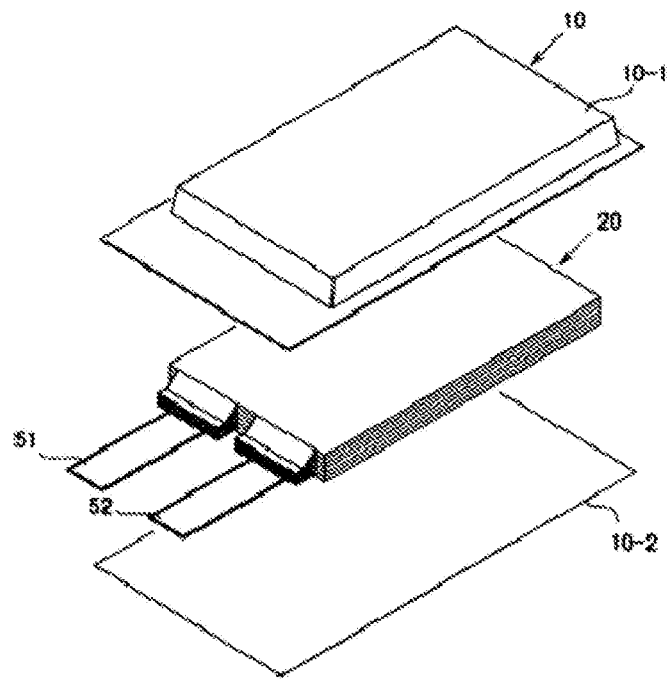
FIG. 1 is an exploded perspective view showing a basic structure of a film package battery.

1) Binder Composition for a Secondary Battery

The binder composition for a secondary battery comprises a polyamic acid and optionally a solvent.

<Polyamic Acid>

Polyamic acids are obtained by polymerizing a tetracarboxylic acid dianhydride and a diamine. Accordingly, polyamic acids comprise a repeating unit consisting of a skeleton based on a tetracarboxylic acid dianhydride and a skeleton based on a diamine. These two skeletons are condensed through an amide bond to form a polyamic acid.

More specifically, polyamic acids comprise a repeating unit represented by the following chemical formula (1).

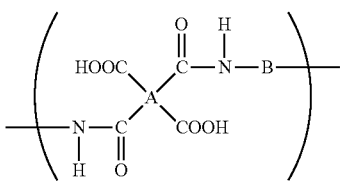

Chemical formula (1)

In chemical formula (1), A represents a tetravalent group of a tetracarboxylic acid dianhydride, from which acid anhydride groups have been removed, and B represents a divalent group of a diamine, from which amino groups have been removed.

In the first embodiment, in chemical formula (1), A represents a tetravalent group of an aromatic tetracarboxylic acid dianhydride, from which acid anhydride groups have been removed, and B represents a divalent group of an alicyclic diamine, from which amino groups have been removed. That is, a polyamic acid comprising a repeating unit consisting of a skeleton based on an aromatic tetracarboxylic acid dianhydride and a skeleton based on an alicyclic diamine is used. In the polyamic acid, the ratio of the number of the repeating units consisting of a skeleton based on an aromatic tetracarboxylic acid dianhydride and a skeleton based on an alicyclic diamine to the total number of the repeating units represented by chemical formula (1) is preferably 50% or more, more preferably 80% or more, and most preferably 100%.

The aromatic tetracarboxylic acid dianhydride is preferably represented by chemical formula (2).

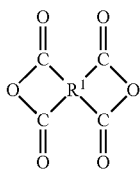

Chemical formula (2)

In chemical formula (2), $R^1$ represents a monocyclic aromatic group, a condensed polycyclic aromatic group, or a non-condensed polycyclic aromatic group which is composed of aromatic groups mutually bonded to each other either directly or via a crosslinking member.

In chemical formula (2), $R^1$ is a tetravalent group having 4 to 27 carbon atoms.

Examples of the aromatic tetracarboxylic acid dianhydride represented by chemical formula (2) include pyromellitic dianhydride, 3,3',4,4'-biphenyltetracarboxylic dianhydride, 3,3',4,4'-benzophenonetetracarboxyic dianhydride, bis(3,4-dicarboxyphenyl)ether dianhydride, bis(3,4-dicarboxyphenyl)sulfide dianhydride, bis(3,4-dicarboxyphenyl) sulfone dianhydride, bis(3,4-dicarboxyphenyl)methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 1,3-bis(3,4-dicarboxyphenoxy)benzene dianhydride, 1,4-bis(3,4-dicarboxyphenoxy)benzene dianhydride, 4,4'-bis(3,4-dicarboxyphenoxy)biphenyl dianhydride, 2,2-bis[(3,4-dicarboxyphenoxy)phenyl] propane dianhydride, 2,3,6,7-naphtalenetetracarboxylic dianhydride, 1,4,5,8-naphtalenetetracarboxylic dianhydride, 2,2', 3,3'-benzophenonetetracarboxylic dianhydride, 2,2',3,3'-biphenyltetracarboxylic dianhydride, 2,2-bis(2,3-dicarboxyphenyl)propane dianhydride, 2,2-bis(2,3-dicarboxyphenyl)-1,1,1,3,3,3-hexafluoropropane dianhydride, bis(2,3-dicarboxyphenyl)ether dianhydride, bis(2,3-dicarboxyphenyl)sulfide dianhydride, bis(2,3-dicarboxyphenyl)sulfone dianhydride, 1,3-(2,3-dicarboxyphenoxy)benzene dianhydride, 1,4-bis(2,3-dicarboxyphenoxy)benzene dianhydride, 1,2,5,6-naphtalenetetracarboxylic dianhydride, 1,3-bis(3,4-dicarboxybenzoyl)benzene dianhydride, 1,4-bis(3,4-dicarboxybenzoyl)benzene dianhydride, 1,3-bis(2,3-dicarboxybenzoyl)benzene dianhydride, 1,4-bis(2,3-dicarboxybenzoyl)benzene dianhydride, 4,4'-isophthaloyldiphthalic anhydride, diazodiphenylmethane-3,3',4,4'-tetracarboxylic dianhydride, diazodiphenylmethane-2,2',3,3'-tetracarboxylic dianhydride, 2,3,6,7-thioxanthonetetracarboxylic dianhydride, 2,3,6,7-anthraquinonetetracarboxylic dianhydride, and 2,3,6,7-xantonetetracarboxylic dianhydride.

Some or all of the hydrogen atoms on the aromatic rings in the aromatic tetracarboxylic acid dianhydride may be substituted with fluoro group, methyl group, methoxy group, trifluoromethyl group, trifluoromethoxy group or the like. The tetracarboxylic acid dianhydride may comprise a group selected from ethynyl group, benzocyclobutene-4'-yl group, vinyl group, allyl group, cyano group, isocyanate group, nitrile group, isopropenyl group and the like, which serves as a crosslinking site. In particular, the aromatic tetracarboxylic acid dianhydride represented by chemical formula (2) preferably comprises a group which severs as a crosslinking site, such as vinylene group, vinylidene group or ethynylidene group, in the main chain skeleton without departing from a range in which the moldability is not impaired.

Examples of the aromatic tetracarboxylic dianhydride containing a fluorine group include 4,4'-(hexafluoroisopropylidene)diphthalic anhydride, 3,3'-(hexafluoroisopropylidene)diphthalic anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propylidene] diphthalic anhydride, 1Hdiliflo[3,4-b:3',4'-i]xanthene-1,3,7, 9(11H)-tetron, 5,5'-oxybis[4,6,7-trifluoropyromelliticanhydride], 3,6-bis(trifluoromethyl) pyromellitic dianhydride, 4-(trifluoromethyl)pyromellitic dianhydride, 1,4-difluoropyromelliticdianhydride, and 1,4-bis(3,4-dicarboxytrifluorophenoxy)tetrafluorobenzene dianhydride.

The alicyclic diamine preferably has a structure represented by chemical formula (3).

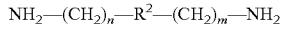

Chemical formula (3)

In chemical formula (3), $R^2$ represents alicyclic group, and n and m each independently represent the number of repeating units selected from 1 to 5.

In chemical formula (3), n and m are preferably 1 or 2 each independently, and most preferably 1. Although the reason for that effect is unclear, it appears that the structure in which a linear hydrocarbon group such as methylene is bonded to a ring improves flexibility, and the binder can withstand the stress due to the active material expanding and contracting during the cycles. In addition, it appears that ring-opening of the imide ring due to the occlusion and diffusion of Li is suppressed by suppressing the charge transfer complex forming ability and the ability of diffusion of Li in the binder, compared to in the case of wholly aromatic binders.

In chemical formula (3), $R^2$ is preferably a monocyclic aliphatic group, a condensed polycyclic aliphatic group, or a non-condensed polycyclic aliphatic group which is composed of alicyclic groups mutually bonded to each other either directly or via a crosslinking member. The number of carbon atoms in $R^2$ is preferably 3 to 27 and more preferably 4 to 10. $R^2$ may have a substituent such as a hydrocarbon group such as methyl group or ethyl group, or a halogen such as fluorine or chlorine. A hetero atom such as O or S may be present in a ring and may be a crosslinking member or a part of a crosslinking member.

Preferably, $R^2$ comprises a cyclohexane ring. Although the reason why this structure is preferred is not clear, it appears that the binder with a cyclohexane structure can withstand the stress due to the active material expanding and contracting during the cycles. In addition, it appears that ring-opening of the imide ring due to the occlusion and diffusion of Li is suppressed by suppressing the charge transfer complex forming ability and the ability of diffusion of Li in the binder, compared to in the case of wholly aromatic binders.

Examples of the alicyclic diamine represented by chemical formula (3) include di(aminomethyl)cyclohexane, diaminomethylbicycloheptane (including norbornanediamines such as norbornanediamine), diaminomethyloxybicycloheptane (including oxanorbornanediamine), diaminomethyltricyclodecane, and the like.

Among them, the compounds represented by the following chemical formula (3-1) or (3-2), which are alicyclic diamines having a structure containing a cyclohexane ring in $R^2$, are particularly preferable.

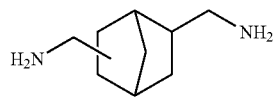

Chemical formula (3-1)

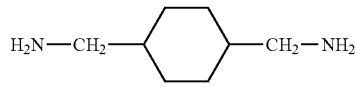

Chemical formula (3-2)

The position of the aminomethyl group of the norbornanethamine represented by chemical formula (3-1) is not particularly limited. For example, the norbornanediamine represented by chemical formula (3-1) may include structural isomers having different aminomethyl group positions, optical isomers including S and R-isomers, and the like. These may be contained in any ratio.

The 1,4-bismethylenecyclohexane skeleton in 1,4-bis(aminomethyl)cyclohexane represented by chemical formula (3-2) includes two kinds of geometric isomers (cis-isomer/trans-isomer). The trans-isomer is represented by chemical formula (X1) and the cis-isomer is represented by chemical formula (X2).

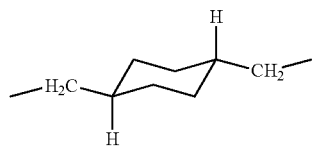

Chemical formula (X1)

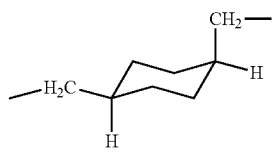

Chemical formula (X2)

The cis/trans ratio in chemical formula (3-2) is preferably 40/60 to 0/100 and more preferably 20/80 to 0/100. The glass transition temperature of the polyimide comprising the diamine residue derived from chemical formula (3-2) is controlled by the cis/trans ratio, and as the ratio of the trans isomer (X1) increases, the glass transition temperature of the polyimide increases. The cis/trans ratio can be measured by nuclear magnetic resonance spectroscopy.

As the alicyclic diamine, one compound may be used alone, or a plurality of compounds may be used in combination. For example, only one skeleton based on the alicyclic diamine represented by chemical formula (3-1) or (3-2) may be contained, and two or more thereof may be contained. Diamines other than the alicyclic diamines represented by chemical formula (3) may be used as the diamine. In such a case, the ratio of the number of the repeating units represented by chemical formula (1) comprising a skeleton based on the alicyclic diamine represented by chemical formula (3), particularly the alicyclic diamine having the structure comprising a cyclohexane ring in $R^2$, such as those represented by chemical formula (3-1) or (3-2), is preferably 50% or more and more preferably 60% or more, based on the total number of the repeating units represented by chemical formula (1).

In the second embodiment, in chemical formula (1), A represents a tetravalent group of an alicyclic tetracarboxylic acid dianhydride, from which acid anhydride groups have been removed, and B represents a divalent group of an aromatic diamine, from which amino groups have been removed. That is, a polyamic acid comprising a repeating unit consisting of a skeleton based on an alicyclic tetracarboxylic acid dianhydride and a skeleton based on an aromatic diamine is used. In the polyamic acid, the ratio of the number of the repeating units consisting of a skeleton based on an alicyclic tetracarboxylic acid dianhydride and a skeleton based on an aromatic diamine to the total number of the repeating units represented by chemical formula (1) is preferably 50% or more, more preferably 80% or more, and most preferably 100%.

The alicyclic tetracarboxylic acid dianhydride is preferably represented by chemical formula (4).

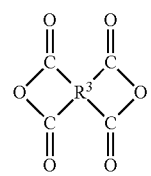

Chemical formula (4)

In chemical formula (4), $R^3$ represents a monocyclic aliphatic group, a condensed polycyclic aliphatic group, and a non-condensed polycyclic aliphatic group which is composed of alicyclic groups mutually bonded to each other either directly or via a crosslinking member.

In chemical formula (4), $R^3$ is a tetravalent group having 4 to 27 carbon atoms.

Examples of the alicyclic tetracarboxylic acid dianhydride represented by formula (4) include cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarbocxylic dianhydride, bicycle[2.2.2]oct-7-ene-2,3,5,6-tetracarboxylic dianhydride, bicycle[2.2.2]octane-2,3,5,6-tetracarboxylic dianhydride, 2,3,5-tricarboxycyclopentylacetic dianhydride, bicycle[2.2.1]heptane-2,3,5-tricarboxylic-6-acetic dianhydride, 1-methyl-3-ethylcyclohexa-1-ene-3-(1,2),5,6-tetracarboxylic dianhydride, decahydro-1,4,5,8-dimethanonaphtalene-2,3,6,7-tetracarboxylic dianhydride, 4-(2,5-dioxotetrahydrofuran-3-yl)-tetralin-1,2-dicarboxylic dianhydride, 3,3',4,4'-dicyclohexyltetracarboxylic dianhydride, octahydropentalene-1,3,4,6-tetracarboxylic dianhydride, tricyclo[4.2.2.02,5]decane-3,4,7,8-tetracarboxylic dianhydride, tricyclo[4.2.2.02,5]deca-7-ene-3,4,9,10-tetracarboxylic dianhydride, 9-oxatricyclo[4.2.1.02,5]nonane-3,4, 7,8-tetracarboxylic dianhydride, and decahydro-1,4:5,8-dimethanonaphtalene-2,3,6,7-tetracarboxylic dianhydride.

The aromatic diamine is not particularly limited, and examples thereof include:

<1> diamines having one benzene ring, such as p-phenylenediamine, m-phenylenediamine, p-xylylenediamine, and m-xylylenediamine;

<2> diamines having two benzene rings, such as 3,3'-diaminodiphenylether, 3,4'-diaminodiphenylether, 4,4'-diaminodiphenylether, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,4'-diaminobenzophenone, 3,3'-diaminodiphenylmethane, 4,4'-diaminodiphenylmethane, 3,4'-diaminodiphenylmethane, 2,2-di(3-aminophenyl)propane, 2,2-di(4-aminophenyl)propane, 2-(3-aminophenyl)-2-(4-aminophenyl)propane, 2,2-di(3-aminophenyl)-1,1,1,3,3,3-hexafluoropropane, 2,2-di(4-aminophenyl)-1,1,1,3,3,3-hexafluoropropane, 2-(3-aminophenyl)-2-(4-aminophenyl)-1,1,1,3,3,3-hexafluoropropane, 1,1-di(3-aminophenyl)-1-phenylethane, 1,1-di(4-aminophenyl)-1-phenylethane, and 1-(3-aminophenyl)-1-(4-aminophenyl)-1-phenylethane;

<3> diamines having three benzene rings, such as 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzyl)benzene, 2,6-bis(3-aminophenoxy)benzonitrile, and 2,6-bis(3-aminophenoxy)pyridine;

<4> diamines having four benzene rings, such as 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy) phenyl]-1,1,1,3,3,3-hexafluoropropane, and 2,2-bis[4-(4-aminophenoxy)phenyl]-1,1,1,3,3,3-hexafluoropropane;

<5> diamines having five benzene rings, such as 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 1,3-bis[4-(3-aminophenoxy)-α,α-dimethylbenzyl]benzene, 1,3-bis[4-(4-aminophenoxy)-α,α-dimethylbenzyl]benzene, 1,4-bis[4-(3-aminophenoxy)-α,α-dimethylbenzyl]benzene, and 1,4-bis[4-(4-aminophenoxy)-α,α-dimethylbenzyl]benzene; and <6> diamines having six benzene rings, such as 4,4'-bis[4-(4-aminophenoxy)benzoyl]diphenylether, 4,4'-bis[4-(4-amino-α,α-dimethylbenzyl)phenoxy]benzophenone, 4,4'-bis[4-(4-amino-α,α-dimethylbenzyl)phenoxy]diphenylsulfone, and 4,4'-bis[4-(4-aminophenoxy)phenoxy]diphenylsulfone.

In addition, the aromatic diamine includes 3,3'-diamino-4,4'-diphenoxybenzophenone, 3,3'-diamino-4,4'-dibiphenoxybenzophenone, 3,3'-diamino-4-phenoxybenzophenone, and 3,3'-diamino-4-biphenoxybenzophenone.

Aromatic diamines containing a fluorine group may be used. Examples thereof include 2,2'-bis(trifluoromethyl)-4, 4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro-(1,1'-biphenyl)-4,4'-diamine, 2,2',6,6'-tetrafluoro-(1,1'-biphenyl)-4,4'-diamine, 4,4'-diaminooctafluorobiphenyl, 2,2-bis(4-aminophenyl)hexafluoropropane, 4,4'-oxybis(2,3,5,6-tetrafluoroaniline) and the like.

Both of the polyimides of the first embodiment and the second embodiment comprise a repeating unit composed of an aromatic skeleton and an alicyclic skeleton. Thereby, when these are used as a polyimide binder, the adhesivity to the active material having a large expansion and contraction can be improved. The first embodiment and the second embodiment may be combined, and the polyamic acid comprising a repeating unit consisting of a skeleton based on an aromatic tetracarboxylic acid dianhydride and a skeleton based on an alicyclic diamine and the polyamic acid comprising a repeating unit consisting of a skeleton based on an alicyclic tetracarboxylic acid dianhydride and a skeleton based on an aromatic diamine may be used in combination.

The polyamic acid may comprise a repeating unit other than those described above in either the first embodiment or the second embodiment. For example, the polyamic acid may comprise a repeating unit comprising a skeleton based on an aliphatic tetracarboxylic acid dianhydride and a repeating unit comprising a skeleton based on an aliphatic diamine. For example, the polyamic acid may comprise a repeating unit comprising a skeleton based on alicyclic diamine in which an amino group is directly bonded to a ring.

Examples of the aliphatic diamine include 1,2,3,4-butane tetracarboxylic dianhydride, 1,2,3,4-cyclobutane tetracarboxylic dianhydride, 1,2,3,4-cyclopentane tetracarboxylic dianhydride, 1,2,4,5-cyclohexane tetracarboxylic dianhydride, bicyclo(2,2,2)octa-7-ene-2,3,5,6-tetracarboxylic dianhydride, bicyclo(2,2,2)octane-2,3,5,6-tetracarboxylic dianhydride.

Examples of the aliphatic diamine include ethylene glycol diamines and alkylenediamines.

Examples of the ethylene glycol diamines include bis (aminomethyl)ether, bis(2-aminoethyl)ether, bis(3-aminopropyl)ether, bis[(2-aminomethoxy)ethyl]ether, bis[2-(2- aminoethoxy)ethyl]ether, bis[2-(3-aminoprotoxy)ethyl] ether, 1,2-bis(aminomethoxy)ethane, 1,2-bis(2-aminomethoxy)ethane, 1,2-bis[2-(aminomethoxy)ethoxy]ethane, 1,2-bis[2-(2-aminoethoxy)ethoxy]ethane, ethylene glycol bis(3-aminopropyl)ether, diethylene glycol bis(3-aminopropyl)ether, and triethylene glycol bis(3-aminopropyl)ether.

Examples of the alkylenediamines include ethylenediamine, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, and 1,12-diaminododecane.

Examples of the alicyclic diamine having an amino group directly bonded to a ring include cyclobutanediamine, cyclohexanethamine, diaminobicycloheptane, diaminooxybicycloheptane, isophoronediamine, diaminotricyclodecane, bis(aminocyclohexyl)methane [or methylenebis(cyclohexylamine)], and bis(aminocyclohexyl)isopropylidene.

Hexacarboxylic acid trihydrides and octacarboxylic acid tetrahydrides may be used in place of the tetracarboxylic acid dianhydride. If a skeleton based on such an anhydride is contained, a branched chain is introduced into the polyamic acid and the corresponding polyimide. These anhydrides may contain only one kind or two or more kinds thereof.

In the binder composition for a secondary battery according to the present invention, a polyamic acid consisting of a repeating unit consisting of a skeleton based on an aromatic tetracarboxylic acid dianhydride and a skeleton based on an aromatic diamine may be mixed in addition to the above polyamic acids. As the aromatic tetracarboxylic dianhydride and the aromatic diamine constituting the repeating unit, those described above can be used.

<Solvent>

A polyamic acid-containing solution can be obtained by reacting a tetracarboxylic acid dianhydride with a diamine in a solvent. The binder composition for a secondary battery may be such a polyamic acid-containing solution. The solvent is not particularly limited as long as it is a solvent capable of dissolving the aforementioned tetracarboxylic acid dianhydride and diamine. For example, the solvent may be an aprotic polar solvent, an ether compound, a water-soluble alcohol solvent, or the like.

Examples of the aprotic polar solvent include N-methyl-2-pyrrolidone, N,N-dimethylformamide, N,N-dimethylacetamide, dimethylsulfoxide, hexamethylphosphoramide, and 1,3-dimethyl-2-imidazolidinone.

Examples of the ether compound include 2-methoxyethanol, 2-ethoxyethanol, 2-(methoxymethoxy)ethoxyethanol, 2-isopropoxyethanol, 2-butoxyethanol, tetrahydrofurfurylalcohol, diethylene glycol, diethylene glycol monomethyl ether, diethylene glycol monoethyl ether, diethylene glycol monobutyl ether, triethylene glycol, triethylene glycol monoethyl ether, tetraethylene glycol, 1-methoxy-2-propanol, 1-ethoxy-2-propanol, dipropylene glycol, dipropylene glycol monomethyl ether, dipropylene glycol monoethyl ether, tripropylene glycol monomethyl ether, polyethylene glycol, polypropylene glycol, tetrahydrofuran, dioxane, 1,2-dimethoxyethane, diethylene glycol dimethyl ether, and diethylene glycol diethyl ether.

Examples of the water-soluble alcohol solvent include methanol, ethanol, 1-propanol, 2-propanol, tert-butylalcohol, ethylene glycol, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, 1,2,6-hexanetriol, and diacetonealcohol.

The polyamic acid-containing solution may comprises either only one solvent or two or more solvents. Among them, N,N-dimethylacetamide, N-methyl-2-pyrrolidone, and a mixture thereof are preferred.

The polyamic acid-containing solution is obtained by reacting the aforementioned tetracarboxylic acid dianhydride with the aforementioned diamine in a solvent. When the number of moles of the diamine in the solvent is referred to as x and the number of moles of the tetracarboxylic acid dianhydride is referred to as y, y/x is preferably 0.9 to 1.1, more preferably 0.95 to 1.05, further preferably 0.97 to 1.03, and particularly preferably 0.99 to 1.01. By polymerizing the tetracarboxylic acid dianhydride and the diamine at such a ratio, the molecular weight (polymerization degree) of the polyamic acid can be adjusted appropriately.

There are no particular limitations on the polymerization procedure. For example, a vessel equipped with a stirrer and a nitrogen inlet is prepared. The vessel is purged with nitrogen and charged with the above solvent. A diamine is then added such that the obtained solution has a solid content of 50% by mass, followed by temperature adjustment and stirring for dissolution. An equimolar amount of a tetracarboxylic acid dianhydride with respect to the diamine is added to the solution, followed by temperature adjustment and stirring for 1 to 50 hours to yield a polyamic acid-containing solution.

When a block poly(amic acid imide) is prepared from the polyamic acid, the block poly(amic acid imide) may be obtained, for example, by adding a solution of an acid anhydride-terminated polyimide to a solution of an amine-terminated polyamic acid, followed by stirring. The polyamic acid is prepared by the aforementioned method.

The amount of the polyamic acid in the polyamic acid-containing solution is preferably 1 to 50% by mass, and more preferably 20 to 45% by mass. When the concentration of the polyamic acid exceeds 50% by mass, the viscosity of the polyamic acid-containing solution becomes excessively high, sometimes making it difficult to coat a substrate with it. On the other hand, when the concentration of the polyamic acid is less than 1% by mass, the viscosity of the polyamic acid-containing solution becomes too low, making it difficult to adjust the viscosity of the electrode mixture paste for a secondary battery. In addition, it takes time to dry the solvent, and the production efficiency of the electrode deteriorates.

The solvent may be water. The polyamic acid can be easily prepared by reacting the tetracarboxylic acid dianhydride and the diamine in the presence of an imidazole in water as a solvent. In this case, in addition to water, an organic solvent may be used in a proportion of 50% by mass or less, preferably 30% by mass or less, and more preferably 10% by mass or less in the total solvent.

Examples of the organic solvent include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl) ether, 1,2-bis(2-methoxyethoxy)ethane, tetrahydrofuran, bis[2-(2-methoxyethoxy)ethyl] ether, 1,4-dioxane, dimethyl sulfoxide, dimethylsulfone, diphenyl ether, sulfolane, diphenylsulfone, tetramethylurea, anisole, m-cresol, phenol, and γ-butyrolactone.

Compounds represented by the following formula (5) are preferred as the imidazole (compound).

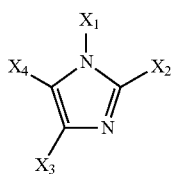

Chemical formula (5)

In chemical formula (5), X1 to X4 are each independently a hydrogen atom or an alkyl group having 1 to 5 carbon atoms.

The imidazole which is used in the present invention is preferably one having a solubility in water at 25° C. of 0.1 g/L or more, and especially 1 g/L or more.

Furthermore, among the imidazole represented by chemical formula (5), an imidazole in which $X_1$ to $X_4$ are each independently a hydrogen atom or an alkyl group having 1 to 5 carbon atoms, and at least two of X1 to X4 are an alkyl group having 1 to 5 carbon atoms, namely, an imidazole having two or more alkyl groups as substituents, is preferred.

Since the imidazole having two or more alkyl groups as substituents is high in the solubility in water, by using such an imidazole, it is possible to easily produce the polyamic acid-containing solution. As such an imidazole, t 1,2-dimethylimidazole (its solubility in water at 25° C. is 239 g/L; hereinafter the same), 2-ethyl-4-methylimidazole (1,000 g/L), 4-ethyl-2-methylimidazole (1,000 g/L), and 1-methyl-4-ethylimidazole (54 g/L) are suitable. It is to be noted that the solubility in water at 25° C. means a critical amount (g) at which the instant material is dissolved in 1 L of water of 25° C. This value may be easily retrieved by SciFinder (registered trademark) that is known as a retrieval service based on data bases of Chemical Abstracts and the like. Here, among solubilities under various conditions, values at a pH of 7 as calculated by Advanced Chemistry Development (ACD/Labs) Software V11.02 (Copy right 1994-2011 ACD/Labs) were adopted. The imidazole to be used may be a single material or may also be a mixture of two or more thereof.

The use amount of the imidazole is preferably 0.8 times equivalents or more, more preferably 1.0 times equivalent or more, and still more preferably 1.2 times equivalents or more based on the carboxyl group of the polyamic acid to be formed through a reaction between the tetracarboxylic acid dianhydride and the diamine that are starting materials. When the use amount of the imidazole is less than 0.8 times equivalents based on the carboxyl group of the polyamic acid, there is a concern that it does not become easy to obtain a uniform polyamic acid-containing solution. Although an upper limit of the use amount of the imidazole is not particularly limited, it is generally less than 10 times equivalents, preferably less than 5 times equivalents, and more preferably less than 3 times equivalents. When the use amount of the imidazole is too large, not only such is not economical, but also there is a concern that the storage stability of the aqueous solution of the polyamic acid is deteriorated.

In the present invention, the "equivalents based on the carboxyl group of the polyamic acid", which defines the amount of the imidazole, means the number (number of molecules) of the imidazole to be used per carboxyl group to form an amic acid group in the polyamic acid. It is to be noted that the number of carboxyl groups to form amic acid groups in the polyamic acid may be calculated on the assumption that two carboxyl groups would be formed per molecule of the tetracarboxylic acid dianhydride as the starting material. Accordingly, the use amount of the imidazole which is used in the present invention is preferably 1.6 times moles or more, more preferably 2.0 times moles or more, and still more preferably 2.4 times moles or more relative to the tetracarboxylic acid dianhydride as the starting material (relative to the tetracarboxylic acid component of the polyamic acid).

The feature of the imidazole resides in the matter that not only the imidazole forms a salt with a carboxyl group of a polyamic acid (polyimide precursor) to be formed through a reaction between the tetracarboxylic acid dianhydride and the diamine as starting materials, thereby increasing the solubility in water, but also on the occasion of subjecting the polyimide precursor to imidization (dehydration-cyclization) to form a polyimide, an extremely high catalytic action is revealed. As a result, when the binder composition for a secondary battery containing the imidazole is used, for example, even by a heat treatment at a lower temperature for a shorter period of time, it becomes possible to easily obtain a polyimide binder having extremely good properties.

As described above, by allowing the tetracarboxylic acid dianhydride and the diamine to react with each other by using water as a reaction solvent in the presence of an imidazole, preferably in the presence of an imidazole having two or more alkyl groups as substituents, it is possible to directly produce the polyamic acid-containing solution extremely simply.

This reaction is performed at a relatively low temperature of 100° C. or lower, and preferably 80° C. or lower for the purpose of inhibiting the imidization reaction by using the tetracarboxylic acid dianhydride and the diamine in approximately equimolar amounts. The reaction temperature is generally 25° C. to 100° C., preferably 40° C. to 80° C., and more preferably 50° C. to 80° C., and the reaction time is preferably about 0.1 to 24 hours, and more preferably about 2 to 12 hours. By allowing the reaction temperature and the reaction time to fall within the foregoing ranges, it is possible to easily obtain an aqueous solution composition containing a polyamic acid having a high molecular weight with good production efficiency. It is to be noted that though the reaction may also be performed in an air atmosphere, the reaction is performed generally in an inert gas atmosphere, and preferably in a nitrogen gas atmosphere.

As for the use of the tetracarboxylic acid dianhydride and the diamine in approximately equimolar amounts, specifically, a molar ratio [(tetracarboxylic acid dianhydride)/(diamine)] is about 0.90 to 1.10, and preferably about 0.95 to 1.05.

In the case of the binder composition for a secondary battery comprising water as a solvent, a polyimide is suitably obtained by performing a heat-treatment to remove water and to conduct imidization (dehydration-cyclization). Although the heat treatment conditions are not particularly limited, the heat treatment is generally performed at 100° C. or more, preferably at 120° C. to 600° C., and more preferably at 150° C. to 500° C. for 0.01 hours to 30 hours, and preferably for 0.01 hours to 10 hours. The polyimide obtained by using a water solvent and an imidazole can exhibit excellent properties, such as high adhesivity to metal, comparable to a general binder composition for a secondary battery using an organic solvent, only by performing the heat treatment at a relatively low temperature (for example, 150° C. to 300° C., and preferably 200° C. to 280° C.).

The polyamic acid prepared as described above is obtained in a solution state. The polyamic acid may be isolated by, for example, pouring the solution into a poor solvent to precipitate the polyamic acid, which may be dissolved in a specific solvent again for use. Otherwise, the obtained polyamic acid solution may be used as it is or may be simply diluted with a solvent for use. From the standpoint of productivity and cost, it is preferred to use the polyamic acid solution as it is without isolating the polyamic acid.

The binder composition for a secondary battery, which comprises an organic solvent, preferably further comprises a pyridine compound. The pyridine compounds can reduce the degree of swelling of the resulting polyimide resin with respect to an electrolyte solution to increase the breaking elongation and breaking energy thereof, and further can suppress the heat-treatment temperature for obtaining an electrode to low level.

The pyridine compound is a compound having a pyridine skeleton in the chemical structure. Preferable examples of the pyridine compound include pyridine, 3-pyridinol, quinoline, isoquinoline, quinoxaline, 6-tert-butyl quinoline, acridine, 6-quinoline carboxylic acid, 3,4-lutidine, and pyridazine. These pyridine compounds may be used alone or in combination of two or more types thereof.

The addition amount of the pyridine compound may be preferably, but not limited to, from 0.05 molar equivalent to 2.0 molar equivalent, more preferably from 0.1 molar equivalent to 1.0 molar equivalent, relative to the amic acid structure in the polyamic acid (per mole of the amic acid structure). Outside this range is not preferable, because it is difficult in some cases to obtain the effects that the pyridine compounds can reduce the degree of swelling of the resulting polyimide resin with respect to an electrolyte solution to increase the breaking elongation and breaking energy thereof, and can suppress the heat-treatment temperature for obtaining an electrode to low level.

2) Electrode Mixture Paste for a Secondary Battery and Secondary Battery Using the Same.

An electrode mixture paste for a secondary battery, which is used for coating a current collector of a secondary battery, can be prepared with the binder composition for a secondary battery. An electrode can be produced by applying the electrode mixture paste for a secondary battery onto a current collector, and further, a secondary battery can be produced using this electrode. The binder composition for a secondary battery can be used in either positive electrodes or negative electrodes. Herein, as one aspect of the embodiments, the binder composition for a secondary battery used in negative electrodes will be described.

<Electrode Mixture Paste for a Secondary Battery>

The electrode mixture paste for a secondary battery comprises the binder composition for a secondary battery and an active material. It is preferred that the electrode mixture paste for a secondary battery further comprises a solvent and is slurry. The active material is a material capable of reversibly intercalating and deintercalating lithium ions upon charge/discharge, and preferable examples thereof include metals, metal oxides, carbons and the like.

Examples of the metal include Li, Al, Si, Pb, Sn, In, Bi, Ag, Ba, Ca, Hg, Pd, Pt, Te, Zn, La, an alloy of two or more thereof or the like. These metals and alloys may be used in combination of two or more. In addition, these metals and alloys may comprise one or more non-metal elements.

Examples of the metal oxide include silicon oxide, aluminum oxide, tin oxide, indium oxide, zinc oxide, lithium oxide, a composite thereof or the like. In the present embodiment, the negative electrode active material preferably comprises tin oxide or silicon oxide, more preferably silicon oxide. This is because silicon oxide is relatively stable and is hardly caused to react with other compounds. As the silicon oxide, ones represented by composition formula $SiO_x$ ($0 < x \leq 2$) are preferred. In addition, one or two or more elements selected from nitrogen, boron and sulfur may also be added to the metal oxide in an amount of, for example, 0.1 to 5% by mass. Such addition can improve the electric conductivity of the metal oxide.

Examples of the carbon material include graphite, amorphous carbon, graphene, diamond-like carbon, a carbon nanotube, a composite thereof or the like. Herein, carbon having high crystallinity has a high electric conductivity, and is excellent in adhesiveness with a positive electrode current collector made of a metal such as copper and excellent in voltage flatness. On the other hand, since amorphous carbon having low crystallinity has relatively low volume expansion, it has a high effect of reducing the volume expansion of the negative electrode as a whole, and hardly causes deterioration due to non-uniformity such as crystal grain boundary or defect.

In order to make use of the high mechanical strength of the binder composition for a secondary battery of the present invention, it is preferable to use an active material having large expansion and contraction during charge and discharge, among these negative electrode active materials. The active materials having large expansion and contraction include Si alloy, Sn, silicon oxide, and tin oxide. In particular, Si alloy and silicon oxide are preferred. This is because it is possible to make use of the advantage of the polyimide binder which can prevent active material layers from being damaged and peeling off from the current collector of the battery, caused by the expansion and contraction. In addition, a lithium ion secondary battery excellent in energy density can be provided with these active materials.

In order to improve battery properties such as cycle characteristics, the electrode mixture paste for a secondary battery may comprises another negative electrode active material in combination with the negative electrode active material with large expansion and contraction during charging and discharging. For example, it is preferable to use Si alloy or silicon oxide in combination with the carbon material such as graphite. In addition, coated active material particles may be used to prevent the damage due to contact between active materials caused by the expansion and contraction. For example, Si ally or silicon oxide coated with a carbon material such as graphite may be used.

With respect to the ratio of the negative electrode active material and the polyamic acid contained in the binder composition for a secondary battery, from the viewpoint of the binding strength and energy density that are in trade off relation with each other, the amount of the polyamic acid is preferably 0.5 to 50 parts by mass, and more preferably 0.5 to 30 parts by mass, based on 100 parts by mass of the negative electrode active material. Polyamic acid are commercially available in the form of a solution, but the mass of the polyamic acid does not include the mass of components other than the polyamic acid, such as solvents.

Examples of the solvent contained in the electrode mixture paste for a secondary battery include conventional solvents used for polyamic acid binders. Examples of the nonaqueous solvent include dimethylformamide, N-methylpyrrolidone, and the like. In addition, the solvent may comprise water.

For the electrode mixture paste for a secondary battery, a conductive assisting agent may be added for the purpose of lowering the impedance. Examples of the conductive assisting agent include flake-like, soot, and fibrous carbon fine particles and the like, for example, carbon black, acetylene black, ketjen black, vapor grown carbon fibers and the like.
<Negative Electrode>

The negative electrode may be produced by applying the electrode mixture paste for a secondary battery onto a negative electrode current collector and conducting heat-treatment. Examples of the method of applying the electrode mixture paste for a secondary battery include a doctor blade method, a die coater method, a CVD method, a sputtering method, and the like.

As the negative electrode current collector on which the electrode mixture paste for a secondary battery is applied, from the viewpoint of electrochemical stability, aluminum, nickel, copper, silver, iron, chromium, molybdenum and alloys thereof are preferred. As the shape thereof, foil, flat plate, mesh and the like are exemplified.

The negative electrode is produced by applying the electrode mixture paste for a secondary battery onto the negative electrode current collector and then cyclodehydrating the polyamic acid to form a polyimide through the heat treatment. The heat treatment temperature is preferably 80 to 400° C., more preferably 120 to 380° C., and particularly preferably 150 to 350° C. When the electrode mixture paste is applied onto a conductive current collector such as copper, the heat treatment may be performed at a temperature within the range of 80 to 300° C., more preferably 120 to 280° C., and particularly preferably 150 to 250° C. The heat treatment may be carried out in multiple stages in order to prevent foaming or powderization. The time for the heat treatment depends on the temperature and the amount of the electrode mixture paste for a secondary battery, but it may be preferably 1 minute or more and 24 hours or less, and more preferably 5 minutes or more and 5 hours or less. Volatile components, such as the solvent, in the electrode mixture paste for a secondary battery may be removed by the heat treatment. After the heat treatment, the polyimide binder adhere the particles of residual components, such as the active material, contained in the electrode mixture paste for a secondary battery to one another to form a negative electrode active material layer on the current collector, and a negative electrode can be obtained. A drying process by heat or vacuum may be also performed before the heat treatment in order to remove the solvent contained in the electrode mixture paste for a secondary battery.

The polyamic acid in the negative electrode active material layer is converted to a polyimide comprising a repeating unit represented by the following chemical formula (6) at least in part by the heat treatment.

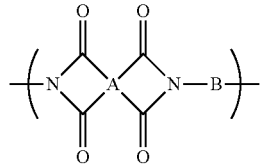

Chemical formula (6)

In chemical formula (6), A and B are the same as in chemical formula (1). A and B of a polyamic acid represented by chemical formula (1) used as a polyimide precursor are the same as A and B of a corresponding polyimide represented by chemical formula (6).

After the heat treatment, the polyamic acid structure may remain. In the polyimide of the present invention contained in the electrode after the heat-treatment, the ratio of the number of the polyimide structure (that is, the repeating units represented by chemical formula (6)) to the total number of the polyamic acid structure (that is, the repeating units represented by chemical formula (1)) and the polyimide structure is preferably 50% or more, more preferably 80% or more, and particularly preferably 95% or more, and may be 100%. An electrode excellent in storage and cycle characteristics can be produced by adjusting the imidization rate within the above range. The imidization rate can be measured by $^1$H-NMR or FTIR.

The polyamic acid and the imidized polymer thereof may be used in combination. The use ratio of the polyamic acid and the imidized polymer thereof may be set arbitrarily as long as the imidization rate of the imidized polymer is within the above preferred range.

In the viewpoint of high capacity, it is better that the content of the polyamic acid and the polyimide in the negative electrode active material layer is low within a range in which the expansion and contraction of the negative electrode active material is suppressed. The content of the polyamic acid and the polyimide in the negative electrode active material layer is preferably 50% by mass or less and more preferably 30% by mass or less. In order to obtain sufficient bond strength of the negative electrode active material, the content of the polyamic acid and the polyimide in the negative electrode active material layer is preferably 0.5% by mass or more.
<Positive Electrode>

The positive electrode active material is not particularly limited as long as it is a material capable of absorbing and desorbing lithium, and may be selected from some viewpoints. From the viewpoint of high energy density, it is preferable to contain a compound having high capacity. Examples of the high capacity compound include lithium nickel composite oxides in which a part of the Ni of lithium nickelate ($LiNiO_2$) is replaced by another metal element, and layered lithium nickel composite oxides represented by the following formula (C) are preferred.

$Li_yNi_{(1-x)}M_xO_2$ (C)

wherein $0 \le x < 1$, $0 < y \le 1.2$, and M is at least one element selected from the group consisting of Co, Al, Mn, Fe, Ti, and B.

It is preferred that the content of Ni is high, that is, x is less than 0.5, further preferably 0.4 or less in the formula (C). Examples of such compounds include $Li_\alpha Ni_\beta Co_\gamma Mn_\delta O_2$ ($0<\alpha \le 1.2$, preferably $1 \le \alpha \le 1.2$, $\beta+\gamma+\delta=1$, $\beta \ge 0.7$, and $\gamma \le 0.2$) and $Li_\alpha Ni_\beta Co_\gamma Al_\delta O_2$ ($0<\alpha \le 1.2$, preferably $1 \le \alpha \le 1.2$, $\beta+\gamma+\delta=1$, $\beta \le 0.6$, preferably $\beta \ge 0.7$, and $\gamma \ge 0.2$) and particularly include $Li_\alpha Ni_\beta Co_\gamma Mn_\delta O_2$ ($0.75 \le \beta \le 0.85$, $0.05 \le \gamma \le 0.15$, and $0.10 \le \delta \le 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (C). In addition, it is also preferred that particular transition metals do not exceed half. Examples of such compounds include $Li_\alpha Ni_\beta Co_\gamma Mn_\delta O_2$ ($0 \le \alpha \le 1.2$, preferably $1 \le \alpha \le 1.2$, $\beta+\gamma+\delta=1$, $0.2 \le \beta \le 0.5$, $0.1 \le \gamma \le 0.4$, and $0.1 \le \delta \le 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (C) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (C)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ (0<x<2), $Li_2MnO_3$, and $Li_xMn_{1.5}Ni_{0.5}O_4$ (0<x<2); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

Examples of the positive electrode binder include polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide and the like. The binder composition for a secondary battery according to the present invention can be also used as the positive electrode binder. In addition to the above, styrene butadiene rubber (SBR) and the like can be used. When an aqueous binder such as an SBR emulsion is used, a thickener such as carboxymethyl cellulose (CMC) can also be used. The above positive electrode binders may be mixed and used. The amount of the positive electrode binder is preferably 2 to 10 parts by mass based on 100 parts by mass of the positive electrode active material, from the viewpoint of the binding strength and energy density that are in a trade-off relation with each other.

For the coating layer containing the positive electrode active material, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the positive electrode current collector, from the viewpoint of electrochemical stability, aluminum, nickel, copper, silver, and alloys thereof are preferred. As the shape thereof, foil, flat plate, mesh and the like are exemplified. In particular, a current collector using aluminum, aluminum alloy or iron-nickel-chromium-molybdenum based stainless steel is preferable.

The positive electrode may be prepared by forming a positive electrode active material layer comprising the positive electrode active material and the positive electrode binder. Examples of a method of forming the positive electrode active material layer include a doctor blade method, a die coater method, a CVD method, a sputtering method, and the like. It is also possible that after forming the positive electrode active material layer in advance, a thin film of aluminum, nickel or an alloy thereof may be formed by a method such as vapor deposition, sputtering or the like to obtain a positive electrode current collector.

<Electrolyte Solution>

The electrolyte solution of the secondary battery according to the present embodiment is not particularly limited, but is preferably a non-aqueous electrolyte solution containing a non-aqueous solvent and a supporting salt which are stable at the operating potential of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) or the like is preferably contained.

The non-aqueous solvent may be used alone, or in combination of two or more.

Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$ and the like. The supporting salts may be used alone or in combination of two or more. From the viewpoint of cost reduction, $LiPF_6$ is preferable.

The electrolyte solution may further contain additives. The additive is not particularly limited, and examples thereof include halogenated cyclic carbonates, unsaturated cyclic carbonates, cyclic or open-chain disulfonic acid esters, and the like. These compounds can improve battery characteristics such as cycle characteristics. This is presumably because these additives decompose during charge/discharge of the secondary battery to form a film on the surface of the electrode active material to inhibit decomposition of the electrolyte solution and supporting salt.

<Separator>

The separator may be of any type as long as it suppresses electron conduction between the positive electrode and the negative electrode, does not inhibit the permeation of charged substances, and has durability against the electrolyte solution. Specific examples of the material include polyolefins such as polypropylene and polyethylene, cellulose, polyethylene terephthalate, polyimide, polyvinylidene fluoride, and aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of the positive electrode, the negative electrode or the separator. Examples of a method for forming the insulation layer include a doctor blade method, a die coater method, a CVD method, a sputtering method, and the like. The insulation layer may be formed at the same time as forming the positive electrode, negative electrode or separator. Materials constituting the insulation layer include a mixture of aluminum oxide, barium titanate or the like and SBR or PVDF.

<Structure of Secondary Battery>

Figure 2:
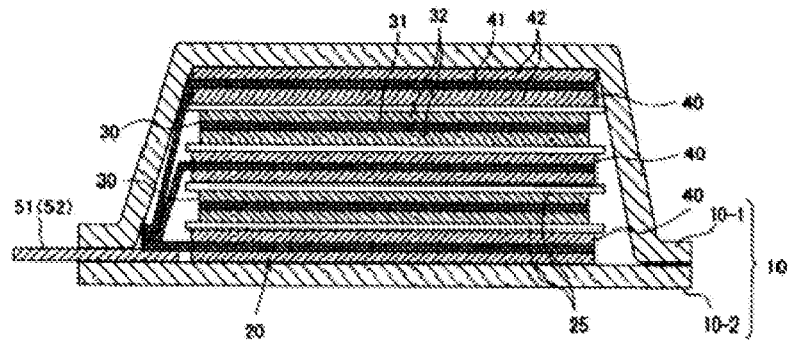
FIG. 2 is a cross-sectional view schematically showing a cross section of the battery of FIG. 1.

The secondary battery according to the present embodiment may be, for example, a secondary battery having a structure as shown in FIGS. 1 and 2. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Secondary Battery>

The secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

<Assembled Battery>

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

<Vehicle>

The secondary battery or the assembled battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

Example

The abbreviations for compounds used in Examples and Comparative examples are as follows.

<Tetracarboxylic Acid Dianhydride>

PMDA: Pyromellitic dianhydride

BPDA: 3,3',4,4'-Biphenyltetracarboxylic dianhydride

ODPA: Bis(3,4-dicarboxyphenyl)ether dianhydride

<Diamine>

NBDA: Norbornanediamine

14BAC: 1,4-Bis(aminomethyl)cyclohexane (trans isomer ratio 84%)

CHDA: 1,4-Diaminocyclohexane (trans isomer ratio 99% or more)

ODA: 4,4'-Diaminodiphenylether

<Solvent>

DMAc: N,N-Dimethylacetamide

NMP: N-Methyl-2-pyrrolidone

Synthetic Example 1

Into a 300 mL five-neck separable flask equipped with a thermometer, a stirring device and a nitrogen introducing tube, 39.7 g (0.180 mol) of PMDA and 130 g of DMAc were added with stirring to prepare PMDA slurry. Also, a mixed solution of 27.8 g (0.180 mol) of NBDA and 27.8 g of DMAc were prepared. While keeping the temperature constant, this mixed solution was dropped to the above slurry over a time period of 120 minutes. Then, the mixture was stirred at 50° C. for 5 hours to obtain a polyamic acid-containing solution.

Synthetic Example 2

Into a 300 mL five-neck separable flask equipped with a thermometer, a stirring device, a nitrogen introducing tube and a drop funnel, 14.01 g (0.099 mol) of 14BAC, 1.7 g (0.011 mol) of NBDA and 189 g of DMAc were added with stirring. Further, into this mixed solution, 29.1 g (0.099 mol) of BPDA and 2.4 g (0.011 mol) of PMDA in the form of powder were introduced. Then, the reaction vessel was bathed in oil bath kept at 120° C. for 5 minutes. After about 3 minutes from the addition of BPDA and PMDA, a salt precipitated, but thereafter, it quickly dissolved. This mixture was further stirred at room temperature for 18 hours to obtain a polyamic acid-containing solution.

Synthetic Example 3

Into a 500 mL five-neck separable flask equipped with a thermometer, a stirring device and a nitrogen introducing tube, 5.71 g (0.050 mol) of CHDA, 7.11 g (0.050 mol) of 14BAC and 230 g of DMAc that is an organic solvent were added with stirring to prepare a solution of a diamine mixture. Further, with stirring, into this solution, 31.0 g (0.100 mol) of ODPA in the form of powder was introduced and the resultant liquid was bathed in oil bath kept at 90° C. for 1 hour to allow reaction to proceed. The liquid, which was ununiform at the beginning, turned into a transparent solution as the reaction progressed, resulting in being a viscous polyamic acid-containing solution.

Synthetic Example 4

Into a 500 mL five-neck separable flask equipped with a stirring device and a nitrogen introducing tube, 440 g of NMP was added as a solvent. Into this, with stirring, 16.78 g (0.147 mol) of CHDA and 43.22 g (0.147 mol) of BPDA were added, and the resultant mixture was stirred at 50° C. for 12 hours to obtain a polyamic acid-containing solution.

Synthetic Example 5

Into a 300 mL five-neck separable flask equipped with a thermometer, a stirring device and a nitrogen introducing tube, 10.0 g (0.050 mol) of ODA and 119 g of DMAc were added and stirred. Into this mixture, 10.9 g (0.050 mol) of PMDA in the form of powder was added with keeping the temperature constant. Then, the mixture was stirred at 50° C. for 5 hours to obtain a polyamic acid-containing solution.

Example 1

Silicon monoxide having an average particle size D50 of 25 μm (made by Kojundo Chemical Laboratory Co., Ltd.), carbon black (3030B: made by Mitsubishi Chemical Corporation), and the polyamic acid of Synthetic example 1 were weighed at a mass ratio of 83:2:15 in terms of the solid content, and mixed with DMAc by a homogenizer such that the content thereof was 43 mass %, to prepare slurry. The slurry was applied to a $Cu_{0.2}Sn$ foil having a thickness of 15 μm using a doctor blade and heated at 120° C. for 7 minutes to remove DMAc. Then the temperature was raised to 300° C. at a rate of 2° C./min, and heating was performed at 300° C. for 2 hours under a nitrogen atmosphere using an inert oven manufactured by Koyo Thermo Systems Co., LTD, so that a negative electrode was produced. A nickel negative electrode terminal for drawing electric charge was welded to the negative electrode.

Lithium cobaltate (made by Nichia Corporation), carbon black (3030B: made by Mitsubishi Chemical Corporation) and polyvinylidene fluoride (made by Kureha Corporation) were weighed at a mass ratio of 95:2:3, and these solids and NMP were mixed at a mass ratio of 52:48 using a homogenizer to form slurry. The slurry was applied to an aluminum foil having a thickness of 15 μm using a doctor blade and heated at 120° C. for 5 minutes to remove NMP, so that a positive electrode was produced. An aluminum positive electrode terminal for drawing electric charge was welded to the positive electrode.

An electrode element was made by overlaying these electrodes on each other with a separator intervened. The resulting electrode element was packaged in a laminate film and an electrolytic solution was filled. Then the laminate film was sealed by heat fusion under reduced pressure to produce a flat plate lithium secondary battery. A polypropylene film was used as the separator. An aluminum-deposited polypropylene film was used as the laminate film. As the electrolytic solution, a mixed solution of ethylene carbonate and diethylene carbonate at a volume ratio of 3:7, containing 1.0 mol/L $LiPF_6$, was used.

The resulting flat plate lithium secondary battery was subjected to charge/discharge in the range from 4.2 V to 2.7 V using a charge/discharge tester (ACD-100M: made by ASKA Electronics Co. Ltd.). The charge was performed in a CCCV mode that is at 1 C constant current until 4.2V and at a constant voltage for 1 hour after voltage reached 4.2V. The discharge was performed in a CC mode at 1 C constant current, and the discharge capacity at the first cycle was measured. As used herein, 1 C means a constant current value which is constantly released from a fully charged battery to finish discharge for 1 hour. In this way, 150 cycles of charge/discharge were performed, and discharge capacity at the 150th cycle was measured. The ratio of the discharge capacity at the 150th cycle to the discharge capacity at the first cycle (150 dc/1 dc) was calculated. The result is shown in Table 1 together with the result of the initial charge/discharge efficiency.

Example 2

A flat plate lithium secondary battery was produced in the same manner as in Example 1 except for using the polyamic acid of Synthetic example 2 instead of the polyamic acid of Synthetic example 1. The charge/discharge was performed, and the initial charge/discharge efficiency and 150 dc/1 dc were measured. The results are shown in Table 1.

Example 3

A flat plate lithium secondary battery was produced in the same manner as in Example 1 except for using the polyamic acid of Synthetic example 3 instead of the polyamic acid of Synthetic example 1. The charge/discharge was performed, and the initial charge/discharge efficiency and 150 dc/1 dc were measured. The results are shown in Table 1.

Comparative Example 1

A flat plate lithium secondary battery was produced in the same manner as in Example 1 except for using the polyamic acid of Synthetic example 4 instead of the polyamic acid of Synthetic example 1. The charge/discharge was performed, and the initial charge/discharge efficiency and 150 dc/1 dc were measured. The results are shown in Table 1.

Comparative Example 2

A flat plate lithium secondary battery was produced in the same manner as in Example 1 except for using the polyamic acid of Synthetic example 5 instead of the polyamic acid of Synthetic example 1. The charge/discharge was performed, and the initial charge/discharge efficiency and 150 dc/1 dc were measured. The results are shown in Table 1.

TABLE 1

| Composition of polyamic acid | | Example 1 | Example 2 | Example 3 | Comparative example 1 | Comparative example 2 |
|---|---|---|---|---|---|---|
| Tetracarboxylic acid component | PMDA (mol %) | 100 | 10 | | | 100 |
| | BPDA (mol %) | | 90 | | 100 | |
| | ODPA (mol %) | | | 100 | | |
| Diamine component | NBDA (mol %) | 100 | 10 | | | |
| | 14BAC (mol %) | | 90 | 50 | | |
| | CHDA (mol %) | | | 50 | 100 | |
| | ODA (mol %) | | | | | 100 |
| Initial charge/discharge efficiency (%) | | 66 | 66 | 66 | 64 | 61 |
| 150 dc/1 dc (%) | | 91 | 90 | 85 | 68 | 47 |

These results show that it is possible to improve initial charge/discharge efficiency and cycle characteristics by defining the structure of the tetracarboxylic acid component and the diamine component of the polyamic acid.

This application claims priority right based on Japanese patent application No. 2016-023455, filed on Feb. 10, 2016, the entire disclosure of which is hereby incorporated by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The secondary battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE

10 film package
20 battery element
25 separator
30 positive electrode
40 negative electrode

The invention claimed is:

1. An electrode mixture paste for a secondary battery comprising the binder composition for a secondary battery and a negative electrode active material comprising Si and/or a silicon oxide, wherein
the binder composition comprises:
a polyamic acid comprising a repeating unit consisting of a skeleton based on an aromatic tetracarboxylic acid dianhydride and a skeleton based on an alicyclic diamine selected from a diamine represented by formula (3-1):

formula (3-1)

2. The electrode mixture paste for a secondary battery according to claim 1, wherein the negative electrode active material comprises a graphite.

3. A lithium ion secondary battery, comprising:
a negative electrode comprising a polyimide comprising a repeating unit consisting of a skeleton based on an aromatic tetracarboxylic acid dianhydride and a skeleton based on an alicyclic diamine selected from a diamine represented by formula (3-1):

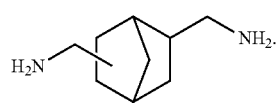

formula (3-1)

4. The lithium ion secondary battery according to claim 3, comprising a negative electrode comprising a negative electrode active material comprising Si and/or a silicon oxide.

5. The lithium ion secondary battery according to claim 3, wherein a ratio of a number of the repeating unit with respect to a total number of repeating units represented by formula (6) is 10% or more,

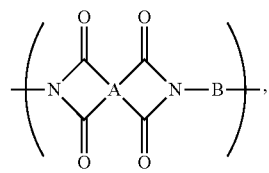

formula (6)

wherein, in formula (6), "A" represents a tetravalent group of a tetracarboxylic acid dianhydride, from which acid anhydride groups have been removed, and "B" represents a divalent group of a diamine, from which amino groups have been removed.

6. The lithium ion secondary battery according to claim 3, wherein the polyimide consists of the repeating unit consisting of the skeleton based on an aromatic tetracarboxylic acid dianhydride and the skeleton based on an alicyclic diamine selected from formula (3-1).

7. The lithium ion secondary battery according to claim 6, wherein the aromatic tetracarboxylic acid dianhydride is pyromellitic dianhydride.

\* \* \* \* \*

UNITED STATES PATENT AND TRADEMARK OFFICE
CERTIFICATE OF CORRECTION

PATENT NO. : 10,707,491 B2  
APPLICATION NO. : 16/076933  
DATED : July 7, 2020  
INVENTOR(S) : Serizawa Page 1 of 1

It is certified that error appears in the above-identified patent and that said Letters Patent is hereby corrected as shown below:

In the Specification

Column 1, Citation List, Lines 64-65; Delete "116-163031" and insert --H6-163031-- therefor Column 5, Description of Embodiments, Lines 45-46; Delete "norbornanethamine" and insert --norbornanediamine-- therefor Column 9, Description of Embodiments, Lines 14-15; Delete "cyclohexanethamine," and insert --cyclohexanediamine,-- therefor Column 11, Description of Embodiments, Line 11; Delete "X1 to X4" and insert --$X_1$ to $X_4$-- therefor Column 11, Description of Embodiments, Line 19; Delete "X1 to X4" and insert --$X_1$ to $X_4$-- therefor Signed and Sealed this  
Seventeenth Day of November, 2020

Andrei Iancu  
*Director of the United States Patent and Trademark Office*